United States Patent
Kojima et al.

(10) Patent No.: US 9,546,638 B2
(45) Date of Patent: Jan. 17, 2017

(54) INTERNAL COMBUSTION ENGINE AND CONTROL DEVICE OF INTERNAL COMBUSTION ENGINE

(75) Inventors: Susumu Kojima, Susono (JP); Naoki Nakanishi, Susono (JP); Yukihiko Ideshio, Nissin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 120 days.

(21) Appl. No.: 14/391,955

(22) PCT Filed: Apr. 11, 2012

(86) PCT No.: PCT/JP2012/059942
§ 371 (c)(1),
(2), (4) Date: Oct. 20, 2014

(87) PCT Pub. No.: WO2013/153644
PCT Pub. Date: Oct. 17, 2013

(65) Prior Publication Data
US 2015/0122219 A1    May 7, 2015

(51) Int. Cl.
*F02B 5/00* (2006.01)
*F02P 5/04* (2006.01)
(Continued)

(52) U.S. Cl.
CPC .............. *F02P 5/045* (2013.01); *F02D 37/02* (2013.01); *F02D 41/062* (2013.01);
(Continued)

(58) Field of Classification Search
CPC ..... F02B 2075/125; F02B 1/12; F02B 23/101; F02D 2041/389; F02D 41/401
(Continued)

(56) References Cited

U.S. PATENT DOCUMENTS 5,535,620 A * 7/1996 Nichols .................. F01N 11/00
                                                                701/105
7,827,975 B1   11/2010 Gibson et al.
(Continued)

FOREIGN PATENT DOCUMENTS

CN              1543536 A     11/2004
DE    10 2006 043 678 A1      3/2008
(Continued)

OTHER PUBLICATIONS

International Search Report Issued May 15, 2012 in PCT/JP12/059942 Filed Apr. 11, 2012.

*Primary Examiner* — Lindsay Low
*Assistant Examiner* — Charles Brauch
(74) *Attorney, Agent, or Firm* — Oblon, McClelland, Maier & Neustadt, L.L.P.

(57) ABSTRACT

A control device (7) of a cylinder direct injection type internal combustion engine (1) controls a fuel injection device (4) and an ignition device (5), executes injection of the fuel and ignition over multiple times, and executes a control of varying an interval between a timing of the injection of the fuel and a timing of the ignition, at the time of an ignition start in which the fuel is injected into a combustion chamber (3) in an expansion stroke with rotation of an output shaft (6) is stopped state and the fuel is ignited to start the rotation of the output shaft (6). The control device (7) varies the interval between the timing of the injection of the fuel and the timing of the ignition by adjusting a correlation of a pitch of the injection of the fuel over multiple times and a pitch of the ignition over multiple times. Therefore, the internal combustion engine (1) and the control device (7) have an effect of being able to enhance the starting property.

6 Claims, 11 Drawing Sheets

(51) Int. Cl.

| | |
|---|---|
| *F02N 99/00* | (2010.01) |
| *F02P 5/15* | (2006.01) |
| *F02P 15/08* | (2006.01) |
| *F02D 41/06* | (2006.01) |
| *F02D 37/02* | (2006.01) |
| *F02B 1/12* | (2006.01) |
| *F02B 75/12* | (2006.01) |
| *F02B 23/10* | (2006.01) |
| *F02D 41/40* | (2006.01) |
| *F02D 41/00* | (2006.01) |
| *F02P 3/04* | (2006.01) |
| *F02P 3/045* | (2006.01) |
| *F02P 3/05* | (2006.01) |

(52) U.S. Cl.
CPC ......... *F02D 41/402* (2013.01); *F02N 99/004* (2013.01); *F02N 99/006* (2013.01); *F02N 99/008* (2013.01); *F02P 5/1506* (2013.01); *F02P 15/08* (2013.01); *F02B 1/12* (2013.01); *F02B 23/101* (2013.01); *F02B 23/105* (2013.01); *F02B 2023/106* (2013.01); *F02B 2075/125* (2013.01); *F02D 41/009* (2013.01); *F02D 41/401* (2013.01); *F02P 3/0414* (2013.01); *F02P 3/0456* (2013.01); *F02P 3/053* (2013.01); *Y02T 10/44* (2013.01); *Y02T 10/46* (2013.01)

(58) Field of Classification Search
USPC ........................................................ 123/305
See application file for complete search history.

(56) References Cited

U.S. PATENT DOCUMENTS

| | | | |
|---|---|---|---|
| 2004/0200448 | A1 | 10/2004 | Kojima et al. |
| 2004/0261767 | A1 | 12/2004 | Sawada et al. |
| 2010/0145594 | A1* | 6/2010 | Wermuth ................. F02B 1/06 701/102 |

FOREIGN PATENT DOCUMENTS

| | | |
|---|---|---|
| EP | 1 760 296 A1 | 3/2007 |
| JP | 7 229464 | 8/1995 |
| JP | 2004 28046 | 1/2004 |
| JP | 2004 316455 | 11/2004 |

* cited by examiner

INTERNAL COMBUSTION ENGINE AND CONTROL DEVICE OF INTERNAL COMBUSTION ENGINE

FIELD

The present invention relates to an internal combustion engine and a control device of the internal combustion engine.

BACKGROUND

As a control device of a conventional internal combustion engine mounted on a vehicle, patent literature 1 describes, for example, a starting device of the internal combustion engine that can start the internal combustion engine by igniting fuel supplied to a cylinder in an expansion stroke. The starting device of the internal combustion engine predicts an operation state of a crank of when ignition is carried out on the cylinder in the expansion stroke while a starter is not operating, and determines whether or not to operate the starter based on the predicted operation state of the crank. If determined that a piston of a cylinder following the cylinder in the expansion stroke does not exceed a compression top dead center with only an initial explosion, for example, the starting device of the internal combustion engine starts a starter motor after the crank is operated by the initial explosion.

CITATION LIST

Patent Literature

Patent Literature 1: Japanese Patent Application Laid-open No. 2004-316455

SUMMARY

Technical Problem

A starting device of the internal combustion engine described in patent literature 1 operates the starter at an optimum timing according to the configuration described above to enhance the starting property of when carrying out ignition with respect to the fuel supplied to the cylinder in the expansion stroke, but improvements still can be made in terms of more reliably starting the internal combustion engine, for example.

In light of the foregoing, it is an object of the present invention to provide an internal combustion engine and a control device of the internal combustion engine capable of enhancing the starting property.

Solution to Problem

In order to achieve the above mentioned object, an internal combustion engine according to the present invention includes a combustion chamber in which a mixture gas of air and fuel is combustible; a cylinder direct injection type fuel injection device configured to be able to inject the fuel to the combustion chamber; an ignition device configured to be able to ignite the mixture gas in the combustion chamber; an output shaft capable of rotating with combustion of the mixture gas in the combustion chamber; and a control device configured to control the fuel injection device and the ignition device to execute injection of the fuel and ignition over multiple times and execute a control of varying an interval between a timing of the injection of the fuel and a timing of the ignition, at the time of an ignition start in which the fuel is injected into the combustion chamber in an expansion stroke with rotation of the output shaft is stopped state and the fuel is ignited to start the rotation of the output shaft, wherein the control device varies the interval between the timing of the injection of the fuel and the timing of the ignition by adjusting a correlation of a pitch of the injection of the fuel over multiple times and a pitch of the ignition over multiple times.

According to a reference example, in the internal combustion engine, it may be configured that at the time of the ignition start, the control device makes the pitch of the injection of the fuel over multiple times and the pitch of the ignition over multiple times constant, respectively, and creates a phase difference with each other.

According to a reference example, in the internal combustion engine, it may be configured that at the time of the ignition start, the control device sets the pitch of the injection of the fuel over multiple times to a pitch obtained by adding a value, which is obtained by dividing the pitch of the ignition by a number of injections of the injection of the fuel, to an integral multiple of the pitch of the ignition over multiple times.

According to a reference example, in the internal combustion engine, it may be configured that at the time of the ignition start, the control device sets the pitch of the ignition over multiple times to a pitch obtained by dividing a value, which is obtained by multiplying a number of injections of the injection of the fuel to the pitch of the injection of the fuel over multiple times, with a value, which is obtained by adding one to the number of injections of the injection of the fuel.

Further, in the internal combustion engine, it is possible to configure that at the time of the ignition start, the control device controls the ignition device and executes a control of varying the pitch of the ignition over multiple times.

Further, in the internal combustion engine, it is possible to configure that the control device makes the pitch of the ignition over multiple times relatively long with respect to the pitch of the ignition of a previous time with elapse of time.

Further, in the internal combustion engine, it is possible to configure that the control device makes the pitch of the ignition over multiple times relatively short with respect to the pitch of the ignition of the previous time with elapse of time.

According to a reference example, in the internal combustion engine, it may be configured that at the time of the ignition start, the control device controls the fuel injection device to execute a control of varying the pitch of the injection of the fuel over multiple times.

Further, in the internal combustion engine, it is possible to configure that the fuel injection device carries out injection of the fuel in response to a fuel injection signal transmitted from the control device, the ignition device carries out ignition in response to an ignition signal transmitted from the control device, and the control device executes the control of varying an interval between the timing of the injection of the fuel and the timing of the ignition by shifting an interval between the fuel injection signal and the ignition signal.

In order to achieve the above mentioned object, a control device of an internal combustion engine according to the present invention, the control device controls a fuel injection device and an ignition device of a cylinder direct injection type internal combustion engine in which a mixture gas of air and fuel is combustible in a combustion chamber, executes injection of the fuel and ignition over multiple times, executes a control of varying an interval between a timing of the injection of the fuel and a timing of the ignition, at the time of an ignition start in which the fuel is injected into the combustion chamber in an expansion stroke with rotation of an output shaft of the internal combustion engine is stopped state and the fuel is ignited to start the rotation of the output shaft, and the control device varies the interval between the timing of the injection of the fuel and the timing of the ignition by adjusting a correlation of a pitch of the injection of the fuel over multiple times and a pitch of the ignition over multiple times, and at the time of the ignition start, the control device controls the ignition device, executes a control of varying the pitch of the ignition over multiple times, and makes the pitch of the ignition over multiple times relatively long with respect to the pitch of the ignition of a previous time with elapse of time.

In order to achieve the above mentioned object, in a control device of an internal combustion engine according to the present invention, the control device controls a fuel injection device and an ignition device of a cylinder direct injection type internal combustion engine in which a mixture gas of air and fuel is combustible in a combustion chamber, executes injection of the fuel and ignition over multiple times, executes a control of varying an interval between a timing of the injection of the fuel and a timing of the ignition, at the time of an ignition start in which the fuel is injected into the combustion chamber in an expansion stroke with rotation of an output shaft of the internal combustion engine is stopped state and the fuel is ignited to start the rotation of the output shaft, the control device varies the interval between the timing of the injection of the fuel and the timing of the ignition by adjusting a correlation of a pitch of the injection of the fuel over multiple times and a pitch of the ignition over multiple times, and at the time of the ignition start, the control device controls the ignition device, executes a control of varying the pitch of the ignition over multiple times, and makes the pitch of the ignition over multiple times relatively short with respect to the pitch of the ignition of a previous time with elapse of time.

Advantageous Effects of Invention

An internal combustion engine and a control device of the internal combustion engine according to the present invention have an effect of being able to enhance the starting property.

DESCRIPTION OF EMBODIMENTS

Hereinafter, embodiments according to the present invention will be described in detail based on the drawings. The invention is not limited by such embodiments. The configuring elements in the following embodiments include elements that are easily replaceable by those skilled in the art or elements that are substantially the same.

First Embodiment

Figure 1:
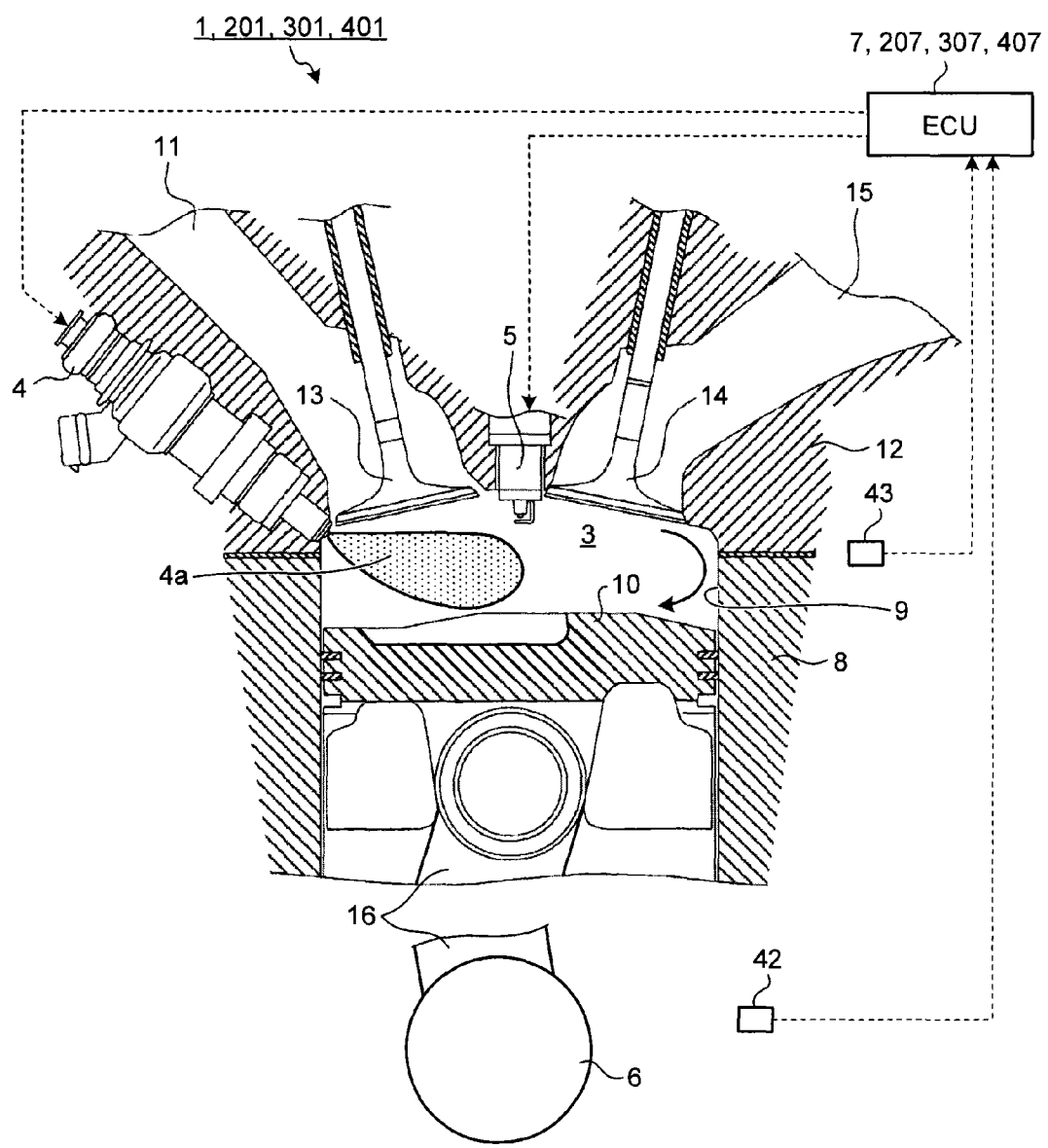
FIG. 1 is a partial cross-sectional view including a combustion chamber of an engine according to a first embodiment.
Figure 2:
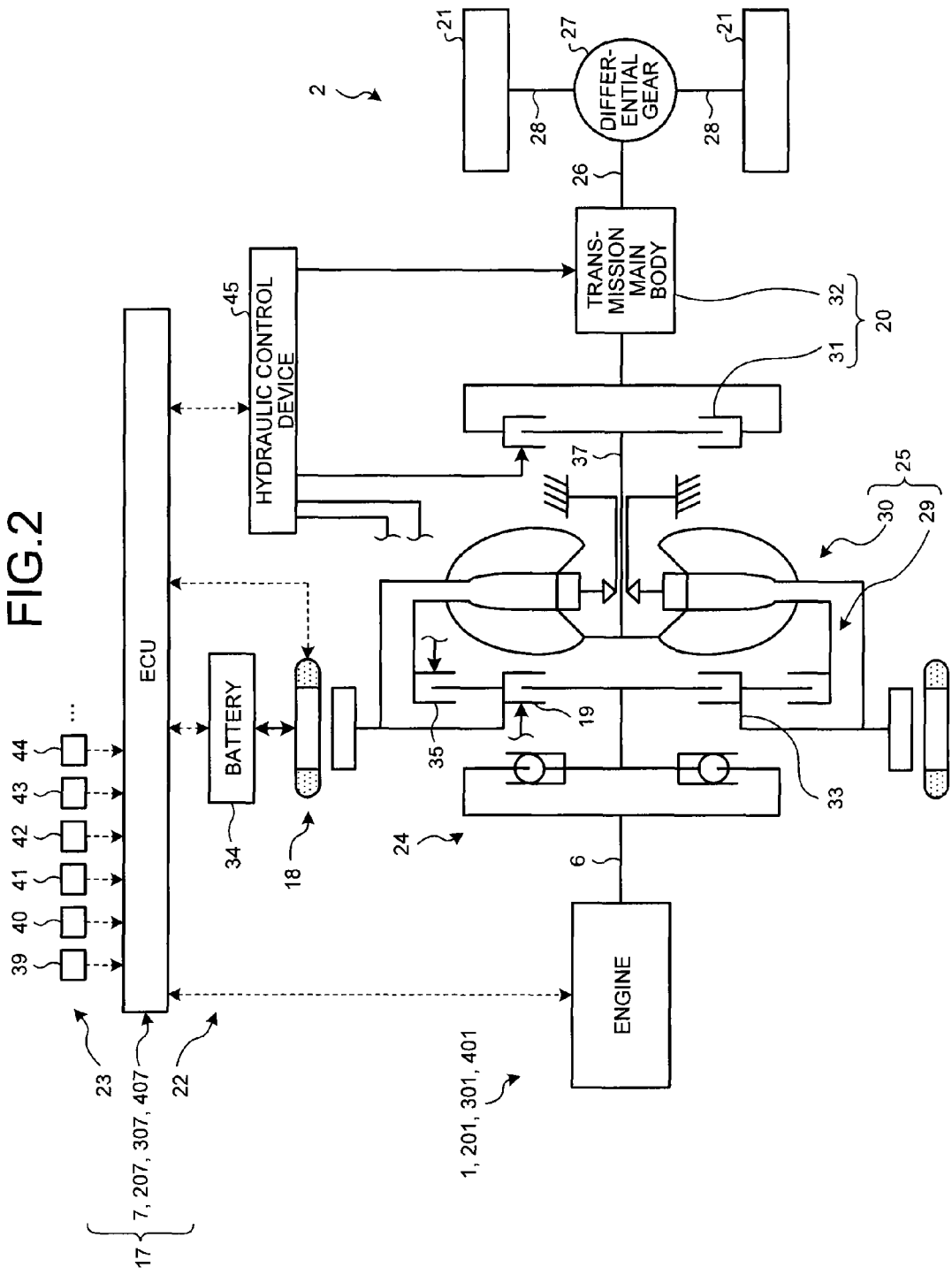
FIG. 2 is a schematic configuration diagram of a vehicle control system to which the engine according to the first embodiment is applied.
Figure 3:
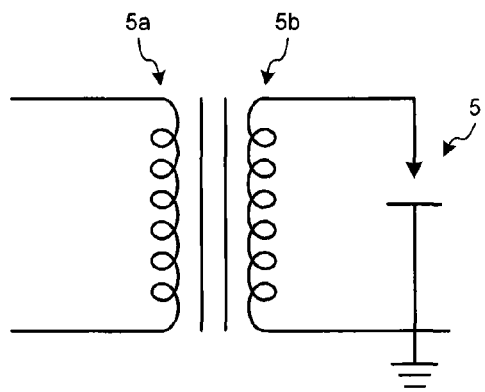
FIG. 3 is a schematic view illustrating one example of an ignition plug of the engine according to the first embodiment.
Figure 4:
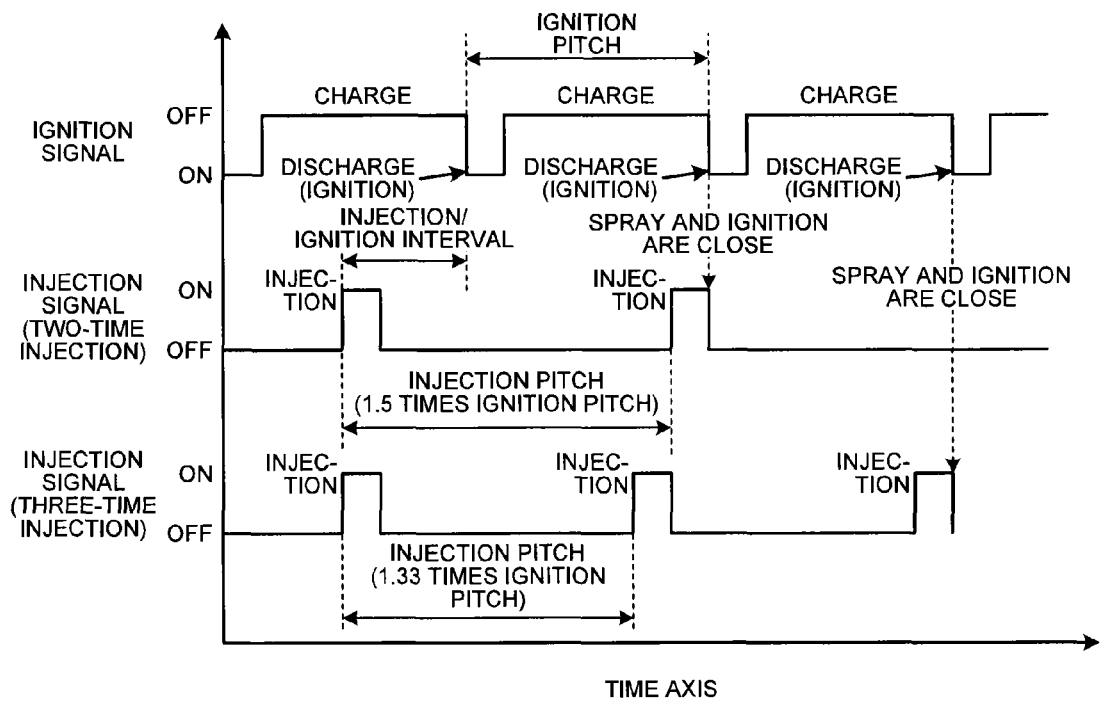
FIG. 4 is a timing chart illustrating one example of an ignition pitch and an injection pitch of the engine according to the first embodiment.
Figure 5:
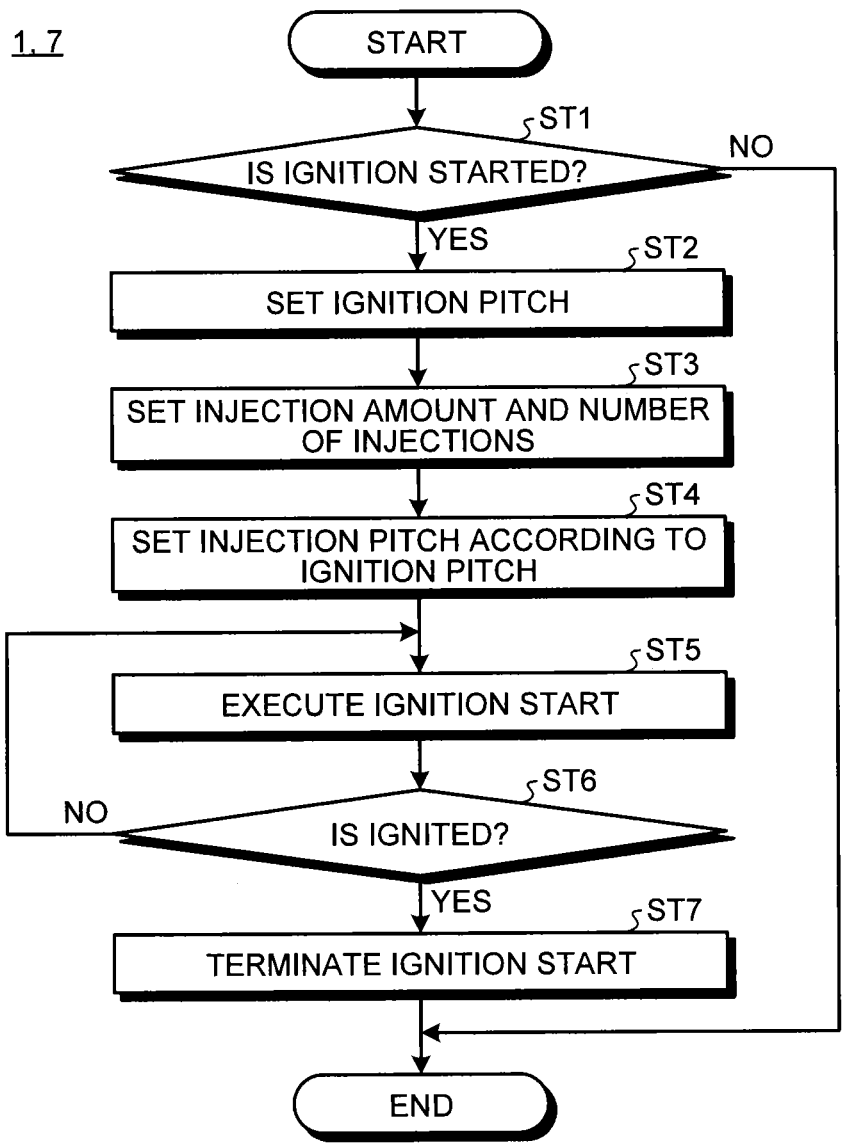
FIG. 5 is a flowchart illustrating one example of an interval varying control by an ECU of the engine according to the first embodiment.
Figure 6:
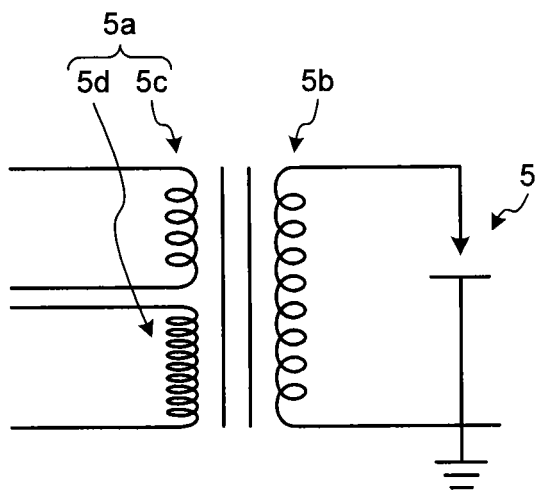
FIG. 6 is a schematic view illustrating one example of an ignition plug of an engine according to a modification.
Figure 7:
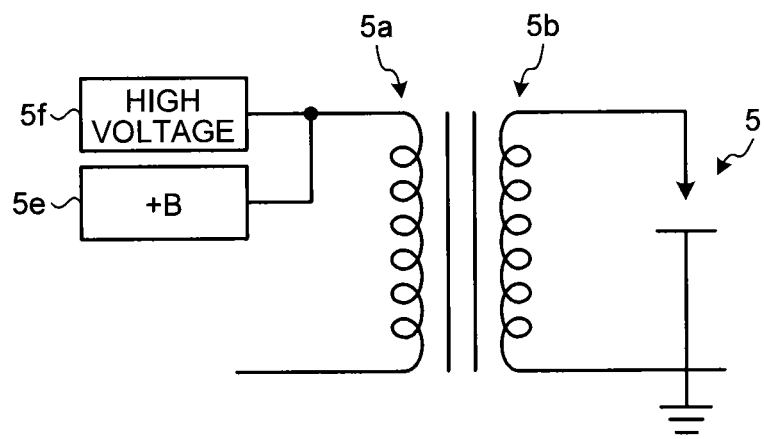
FIG. 7 is a schematic view illustrating one example of an ignition plug of an engine according to a modification.
Figure 8:
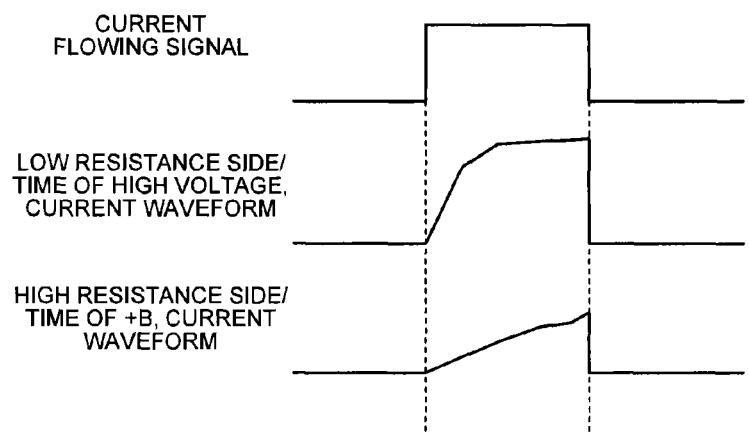
FIG. 8 is a diagrammatic view illustrating one example of a current waveform of the ignition plug of the engine according to the modification.

FIG. 1 is a partial cross-sectional view including a combustion chamber of an engine according to a first embodiment; FIG. 2 is a schematic configuration diagram of a vehicle control system to which the engine according to the first embodiment is applied; FIG. 3 is a schematic view illustrating one example of an ignition plug of the engine according to the first embodiment; FIG. 4 is a timing chart illustrating one example of an ignition pitch and an injection pitch of the engine according to the first embodiment; FIG. 5 is a flowchart illustrating one example of an interval varying control by an ECU of the engine according to the first embodiment; FIGS. 6 and 7 are schematic views illustrating one example of an ignition plug of an engine according to a modification; and FIG. 8 is a diagrammatic view illustrating one example of a current waveform of the ignition plug of the engine according to the modification.

As illustrated in FIGS. 1 and 2, an engine 1 serving as an internal combustion engine according to the present embodiment is applied as a travelling drive source of a vehicle 2. The engine 1 includes a combustion chamber 3, a fuel injection valve 4 serving as a cylinder direct injection type fuel injection device, an ignition plug 5 serving as an ignition device, a crankshaft 6 serving as an output shaft, and an ECU 7 serving as a control device. The combustion chamber 3 can combust a mixture of air and fuel. The fuel injection valve 4 can inject fuel to the combustion chamber 3. The ignition plug 5 can ignite a mixture gas in the combustion chamber 3. The crankshaft 6 can rotate with the combustion of the mixture gas in the combustion chamber 3.

The ECU 7 controls each unit of the engine 1. The engine 1 is a multi-cylinder cylinder direct injection type internal combustion engine. The engine 1 may be an in-line multi-cylinder engine or a V-shaped multi-cylinder engine.

More specifically, the engine 1 is a heat engine that combusts the fuel in the combustion chamber 3 to convert the energy of the fuel to a mechanical work and output the same as power. The engine 1 causes the crankshaft 6 to generate a mechanical power (engine torque) accompanying the combustion of fuel, and outputs the mechanical power from the crankshaft 6. The engine 1 is a so-called four-cycle engine in which a series of four strokes including an intake stroke, a compression stroke, an expansion stroke, and an exhaust stroke is carried out while a piston 10, which is arranged in a cylinder bore 9 formed in the cylinder block 8 so as to reciprocate therein, reciprocates two times.

The engine 1 directly injects a fuel spray 4a to the combustion chamber 3 with the fuel injection valve (injector) 4. The fuel injection valve 4 is supplied, through a delivery pipe, and the like, with fuel pressurized to a feed pressure with an electrical feed pump, and further pressurized to a high pressure with a high pressure pump, and injects the fuel of high pressure to the combustion chamber 3. The fuel injection valve 4 is positioned on an intake port 11 side of each cylinder, and is arranged to be inclined by a predetermined angle in an up and down direction. The ignition plug 5 is attached to a cylinder head 12 so as to be positioned above the combustion chamber 3. The fuel injection valve 4 and the ignition plug 5 are electrically connected to the ECU 7 so that the operation is controlled by the ECU 7. The fuel injection valve 4 carries out the injection of the fuel in response to a fuel injection signal (hereinafter sometimes referred to as "injection signal") transmitted from the ECU 7. The ignition plug 5 carries out the ignition in response to an ignition signal transmitted from the ECU 7.

Typically in the engine 1, when the piston 10 is lowered from the top dead center of the intake stroke in the cylinder bore 9, air is taken into the combustion chamber 3 through an intake tube, a surge tank, an intake manifold, the intake port 11, and the like accompanying the opening of an intake valve 13 (intake stroke). Furthermore, in the engine 1, when the piston 10 is raised in the cylinder bore 9 through a bottom dead center of the intake stroke, the air is compressed (compression stroke). In this case, in the engine 1, the fuel is injected from the fuel injection valve 4 to the combustion chamber 3 in the intake stroke or the compression stroke, so that the fuel and the air are mixed thus forming the mixture gas. In the engine 1, the mixture gas is ignited by the ignition plug 5 when the piston 10 approaches the region of the top dead center of the compression stroke so that the mixture gas is ignited and combusted, where the combustion pressure lowers the piston 10 (expansion stroke). When the piston 10 is again raised toward the top dead center of the intake stroke through the bottom dead center of the expansion stroke, the mixture gas after the combustion is discharged as exhaust gas through an exhaust port 15 accompanying the opening of an exhaust valve 14 (exhaust stroke).

The reciprocating motion of the piston 10 in the cylinder bore 9 is transmitted to the crankshaft 6 through a connecting rod 16, and the like, and converted to a rotation motion, and retrieved as an output. The piston 10 reciprocates in the cylinder bore 9 with the rotation of the crankshaft 6 when the crankshaft 6 is further rotated by an inertia force with a counterweight. When the crankshaft 6 makes two rotations, the piston 10 can reciprocate two times in the cylinder bore 9. In the meantime, a series of four strokes including the intake stroke, the compression stroke, the expansion stroke, and the exhaust stroke can be carried out and one explosion can be carried out in the combustion chamber 3.

By way of example, as illustrated in FIG. 2, a case in which the engine 1 is applied to a so-called one motor parallel hybrid type vehicle control system 17 will be described. The vehicle control system 17 includes one engine 1 and one motor generator 18, and furthermore, includes a clutch 19 that can freely connect and disconnect the engine 1 and the motor generator 18. The engine 1 is not limited to the hybrid type vehicle control system 17 described below, and may be applied to a system that includes the engine 1 as a travelling drive source but does not include the motor generator 18.

Specifically, the vehicle control system 17 of the present embodiment is a system that is mounted on the vehicle 2 to control the vehicle 2. The vehicle 2 is a so-called "hybrid vehicle" mounted with the engine 1 serving as an internal combustion engine and the motor generator 18 serving as a rotating electrical machine, as travelling power sources (motors) for travelling the vehicle 2. More specifically, the vehicle 2 is a so-called 1MG+AT type "parallel hybrid vehicle" including one motor generator 18 and a transmission 20, which is an automatic transmission.

The vehicle control system 17 includes a drive device 22 that drives a drive wheel 21 of the vehicle 2, a state detection device 23 that detects a state of the vehicle 2, and the ECU 7 serving as a control device that controls each unit of the vehicle 2 including the drive device 22. A description will be made below assuming the ECU 7 can be used as the control device of the engine 1 and the control device of the vehicle control system 17, but the respective control devices may be separately structured and may be configured to exchange information such as a detection signal, a drive signal, a control command, and the like with each other.

The drive device 22 configures a parallel hybrid type power train in the vehicle 2, and includes one engine 1 and one motor generator 18 thus rotatably driving the drive wheel 21 therewith. As described above, the drive device 22 includes the engine 1, the motor generator 18, the clutch 19, and the transmission 20. The drive device 22 further includes a damper mechanism 24, a torque converter 25, a propeller shaft 26, a differential gear 27, and a drive shaft 28. The torque converter 25 is configured to include a lock-up mechanism 29 and a fluid transmission mechanism 30. The transmission 20 is configured to include a clutch 31 and a transmission main body 32.

In the drive device 22, each configuring element is arranged so that power is mutually transmittable in the order of the engine 1, the damper mechanism 24, the clutch 19, the motor generator 18, the lock-up mechanism 29 and the fluid transmission mechanism 30 of the torque converter 25, the clutch 31 and the transmission main body 32 of the transmission 20, the propeller shaft 26, the differential gear 27, and the drive shaft 28 with respect to the transmission path of the power to the drive wheel 21. In this case, the drive device 22 has the crankshaft 6, which is the output shaft of the engine 1 (output shaft of internal combustion engine) and a rotor shaft 33, which is the output shaft of the motor generator 18 (output shaft of electrical machine) coupled by way of the damper mechanism 24 and the clutch 19. Furthermore, the drive device 22 has the rotor shaft 33 and the drive wheel 21 coupled by way of the torque converter 25, the transmission 20, the propeller shaft 26, the differential gear 27, the drive shaft 28, and the like.

The motor generator 18 is connected to a battery 34 serving as a power accumulating device by way of an inverter, and the like. The clutch 19 can couple the crankshaft 6 of the engine 1 and the rotor shaft 33 of the motor generator 18 by way of the damper mechanism 24. The torque converter 25 is a type of fluid joint, and is coupled to the rotor shaft 33 of the motor generator 18. The torque converter 25 includes the lock-up mechanism 29 that transmits the power from the engine 1 or the motor generator 18 to the output shaft (output shaft of fluid transmission device) 37 through a lock-up clutch 35, and the fluid transmission mechanism 30 that transmits the power to the output shaft 37 through hydraulic oil (operation fluid). The transmission 20 transmits the power from the torque converter 25 to the transmission main body 32 through the clutch 31 to gear change in the transmission main body 32, and outputs the same to the drive wheel 21. The transmission main body 32 is, for example, a so-called automatic transmission such as a stepped automatic transmission (AT), a continuously variable transmission (CVT), a multi-mode manual transmission (MMT), a sequential manual transmission (SMT), a dual clutch transmission (DCT), and the like. The stepped automatic transmission, for example, is adopted for the transmission main body 32 herein.

The drive device 22 configured as above can transmit the power generated by the engine 1 from the crankshaft 6 to the drive wheel 21 through the damper mechanism 24, the clutch 19, the rotor shaft 33, the torque converter 25, the transmission 20, the propeller shaft 26, the differential gear 27, and the drive shaft 28. The drive device 22 can transmit the power generated by the motor generator 18 from the rotor shaft 33 to the drive wheel 21 through the torque converter 25, the transmission 20, the propeller shaft 26, the differential gear 27, and the drive shaft 28 without interposing the clutch 19. As a result, a drive force is generated at the contact area of the drive wheel 21 and the road surface so that the vehicle 2 can travel by such drive force.

The state detection device 23 is configured to detect the state of the vehicle 2, and detects various state amounts and physical amounts representing the state of the vehicle 2, operation states of the switches, and the like. The state detection device 23 is electrically connected to the ECU 7, and can exchange information such as a detection signal, a drive signal, a control command, and the like with each other. The state detection device 23 includes, for example, an accelerator opening sensor 39, a brake sensor 40, a vehicle speed sensor 41, a crank angle sensor 42 (see also FIG. 1), a cylinder pressure sensor 43 (see also FIG. 1), a charging state detector 44, and the like. The accelerator opening sensor 39 detects an accelerator opening that corresponds to the operation amount (accelerator operation amount, acceleration request operation amount) of an accelerator pedal of the vehicle 2 by the driver. The brake sensor 40 detects a master cylinder pressure that corresponds to the operation amount (brake operation amount, braking request operation amount) of a brake pedal of the vehicle 2 by the driver, a brake depressing force, or the like. The vehicle speed sensor 41 detects a vehicle speed, which is the travelling speed of the vehicle 2. The crank angle sensor 42 detects a crank angle, which is the rotation angle of the crankshaft 6. The ECU 7 can determine the intake stroke, the compression stroke, the expansion stroke, and the exhaust stroke in each cylinder of the engine 1, and can calculate the engine rotation number, or the rotation number (rotation speed) of the crankshaft 6, based on the crank angle. The cylinder pressure sensor 43 detects a cylinder pressure, which is the pressure in the combustion chamber 3. The charging state detector 44 detects a power accumulating state SOC corresponding to the power accumulating amount (charging amount), the battery voltage, and the like of the battery 34.

The ECU 7 is a control unit that comprehensively carries out the control of the entire vehicle control system 17, and controls the engine 1, the motor generator 18, and the like in cooperation. The ECU 7 is an electronic circuit having a well-known microcomputer including a CPU, a ROM, a RAM, and an interface as a main body. The ECU 7 is electrically connected with the state detection device 23, and is also electrically connected with the fuel injection valve 4, the ignition plug 5, a throttle device (not illustrated) of the engine 1, the inverter of the motor generator 18, the battery 34, and the like. Furthermore, the ECU 7 is connected to the clutch 19, the clutch 31, the transmission main body 32, the lock-up clutch 35, and the like by way of a hydraulic control device 45, and controls the operations thereof via the hydraulic control device 45. The ECU 7 is input with an electrical signal corresponding to the detection result detected by the state detection device 23, and outputs a drive signal to each unit of the drive device 22 such as the engine 1, the inverter of the motor generator 18, the hydraulic control device 45, and the like according to the input detection result to control the drive thereof.

The ECU 7, for example, controls the throttle device of the engine 1 based on the accelerator opening, the vehicle speed, and the like, adjusts the throttle opening of an intake passage, adjusts an intake air amount, controls the fuel injection amount in correspondence to the change, and adjusts the amount of the mixture gas to be filled in the combustion chamber 3 to control the output of the engine 1. The ECU 7, for example, controls the hydraulic control device 45 based on the accelerator opening, the vehicle speed, and the like, to control a gear changing operation of the transmission main body 32, engagement, release, and slip operation of the clutch 19, the lock-up clutch 35, the clutch 31, and the like.

The engine 1 applied to the vehicle control system 17 can be switched between an operation state and a non-operation state regardless of whether the vehicle 2 is stopped or is travelling. The operation state of the engine 1 (state in which the engine 1 is operated) is a state in which the power to be acted on the drive wheel 21 is generated, and is a state of outputting heat energy generated by combusting the fuel in the combustion chamber 3 in the form of a mechanical energy such as torque, and the like. That is, in the operation state, the engine 1 combusts the fuel in the combustion chamber 3 to generate power to be acted on the drive wheel 21 of the vehicle 2. On the contrary, the non-operation state of the engine 1, that is, a state in which the operation of the engine 1 is stopped is a state in which the generation of the power is stopped and is a state in which the supply of fuel to the combustion chamber 3 is cut (fuel cut), and the fuel is not combusted in the combustion chamber 3 and hence the mechanical energy such as torque, and the like is not output.

The vehicle control system 17 configured as above can cause the vehicle 2 to travel in various modes by having the ECU 7 control the drive device 22, and simultaneously use or selectively use the engine 1 and the motor generator 18.

The ECU 7, for example, causes the clutch 19 to be in the engaged state (clutch ON) and operates the engine 1, and transmits only the power (engine torque) output from the engine 1 of the engine 1 and the motor generator 18, which are the travelling power sources, to the drive wheel 21. In this case, the clutch 31 is in the engaged state (clutch ON). Thus, the vehicle control system 17 can realize the "engine travelling" mode. Therefore, the vehicle 2 can travel using only the engine 1 of the travelling power sources.

Furthermore, for example, the ECU 7 power runs the motor generator 18 according to a requested drive force and the power accumulating state SOC of the battery 34 with the clutch 19 in the engaged state (clutch ON) and the engine 1 in the operation state, and integrates the power output from the engine 1 and the power (motor torque) output from the motor generator 18 and transmits the same to the drive wheel 21. In this case, the clutch 31 is in the engaged state (clutch ON). Thus, the vehicle control system 17 can realize the "HV travelling" mode. Therefore, the vehicle 2 can travel by simultaneously using the engine 1 and the motor generator 18.

Moreover, for example, the ECU 7 power runs the motor generator 18 after having the clutch 19 in the released state (clutch OFF) and the engine 1 stopped to be in the non-operation state, and transmits only the power output from the motor generator 18 of the engine 1 and the motor generator 18, which are the travelling power sources, to the drive wheel 21. In this case, the clutch 31 is in the engaged state (clutch ON). Since the engine 1 is in the non-operation state and the clutch 19 is in the released state, the rotation of the crankshaft 6 is also stopped. Thus, the vehicle control system 17 can realize the "EV travelling" mode. Therefore, the vehicle 2 can travel using only the motor generator 18 of the travelling power sources. In this case, the vehicle 2 is basically in a state in which the crankshaft 6 and the rotor shaft 33 are mechanically separated by the clutch 19 and a rotation resistance of the engine 1 is not acting.

For example, at the time of deceleration travelling of the vehicle 2, the ECU 7 controls the motor generator 18, generates power by regeneration in the motor generator 18 by the power transmitted from the drive wheel 21 to the rotor shaft 33, and transmits the mechanical power (negative motor torque) generated by the rotor shaft 33 accompanying the power generation to the drive wheel 21. In this case, the clutch 31 is in the engaged state (clutch ON), the clutch 19 is in the released state (clutch OFF), and the engine 1 is stopped and in the non-operation state. Thus, the vehicle control system 17 can realize the "regenerative travelling" mode. Therefore, the vehicle 2 is applied with regenerative brake by the motor generator 18 and performs deceleration travelling.

When the engine 1 is in the non-operation state and the engine 1 is to be started from a state in which the rotation of the crankshaft 6 is stopped, for example, the ECU 7 can start the engine 1 using various starting modes. The ECU 7 can, for example, use according to purpose an MG start control serving as a first start control and an ignition start control serving as a second start control according to the situation of the vehicle 2, the situation of when the engine 1 is stopped, and the like.

When executing the MG start control, the ECU 7 starts the engine 1 using the motor generator 18 as the starter motor of the engine 1. In this case, the ECU 7 executes the MG start control in the following manner. In other words, the ECU 7 controls the engine 1, the motor generator 18, and the clutch 19, and first causes the clutch 19 to be in the slip state, and rotates (cranks) the crankshaft 6 of the engine 1 with the power from the motor generator 18. In other words, the ECU 7 causes the clutch 19 to be in the slip state and uses a part of the power output by the motor generator 18 as a cranking torque (starting torque) of the crankshaft 6 to rotate the crankshaft 6. When the rotation number exceeds a predetermined rotation number after the crankshaft 6 is rotated, the ECU 7 injects the fuel from the fuel injection valve 4 to the combustion chamber 3 and ignites the fuel with the ignition plug 5 to start the engine 1 (MG start). Subsequently, the ECU 7 causes the clutch 19 to be in an engaged state of being completely engaged when the engine rotation number becomes a rotation number that enables autonomous driving, the engine 1 is completely started, and the engine rotation number and the motor rotation number are substantially synchronized.

Since the engine 1 is the cylinder direct injection type internal combustion engine, the ECU 7 can start the engine 1 by executing the ignition start control as described below. In other words, the ECU 7 controls the engine 1, injects fuel from the fuel injection valve 4 to the combustion chamber 3 and ignites the fuel with the ignition plug 5 with the rotation of the crankshaft 6 stopped to start the rotation of the crankshaft 6 and start the engine 1. In this case, the ECU 7 first controls the fuel injection valve 4 and the ignition plug 5 of the engine 1, injects the fuel into the combustion chamber 3 of the cylinder in the expansion stroke and ignites the fuel with the rotation of the crankshaft 6 stopped, and starts the rotation of the crankshaft 6 with the combustion energy of the fuel. The ECU 7 controls the motor generator 18 and the clutch 19 with the rotation of the crankshaft 6 started by the combustion energy of the combustion (initial explosion), increases the transmission torque of the clutch 19, as needed, and assists the rotation of the crankshaft 6 with a part of the power from the motor generator 18 through the clutch 19 to start the engine 1 (ignition start). The ECU 7 causes the clutch 19 to be in the engaged state of being completely engaged when the engine rotation number becomes the rotation number enabling autonomous driving, the engine 1 is completely started, and the engine rotation number and the motor rotation number are substantially synchronized. Thus, the engine 1 uses the combustion energy of the fuel by the ignition start to be rotation started, so that the engine activation torque at the time of engine start can be reduced, the MG torque and the power consumption required for starting can be suppressed to enhance the fuel economy performance, and furthermore, the starting responsiveness can be enhanced.

In the cylinder direct injection type engine 1, the ignition property of the initial explosion is important when carrying out the ignition start as described above.

In particular, the ignition in the cylinder in the expansion stroke is an ignition in a state the piston 10 is stopped and there is barely any air flow in the combustion chamber 3. Thus, the engine 1 may be in a state the fuel injected from the fuel injection valve 4 is eccentrically located in the combustion chamber 3 and the mixture gas is scarce around the ignition plug 5 at the time of igniting in the ignition start in the cylinder in the expansion stroke, and hence the ignition property may lower.

In the engine 1 of the present embodiment, the ECU 7 controls the fuel injection valve 4 and the ignition plug 5 in the ignition start, and executes the injection of the fuel and the ignition over multiple times to increase the ignition probability. Furthermore, the engine 1 can realize a more reliable ignition and enhance the starting property by having the ECU 7 execute an interval varying control of varying an interval (hereinafter sometimes referred to as "injection/ignition interval") of a fuel injection timing (hereinafter referred to as "injection timing") and an ignition timing of multiple times.

The injection/ignition interval typically corresponds to the interval of an injection beginning period of the fuel and an ignition beginning period (see FIG. 4).

Specifically, the ECU 7 can control the fuel injection valve 4 to carry out divided injection of injecting the fuel into the combustion chamber 3 over multiple times in the ignition start. Typically, the ECU 7 sets the number of injections according to the position of the piston 10 of the cylinder stopped in the expansion stroke, and the like. For example, since the volume of the combustion chamber 3 is relatively large and an air amount in the combustion chamber 3 is relatively large when the piston 10 is stopped at a position close to the bottom dead center in the expansion stroke, the ECU 7 can relatively increase the fuel injection amount according to the air amount. The ECU 7 calculates the fuel injection amount necessary for the ignition start defined in such manner according to the position of the piston 10, in other words, the crank angle detected by the crank angle sensor 42. The ECU 7 sets the number of injections of the fuel in the ignition start based on a minimum injection time (amount) at which the stable fuel injection can be carried out in the fuel injection valve 4 and the fuel injection amount calculated in the above manner.

The ECU 7 controls the ignition plug 5 to ignite the mixture gas in the combustion chamber 3 over multiple times, or executes a so-called multiple ignition in the ignition start.

In the ignition start, the ECU 7 controls the fuel injection valve 4 to execute multiple fuel injections at a predetermined fuel injection pitch (hereinafter sometimes referred to as "injection pitch"), and controls the ignition plug 5 to execute multiple ignitions at a predetermined ignition pitch (hereinafter sometimes referred to as "ignition pitch") and execute multiple ignition.

The injection pitch corresponds to a period from the fuel injection beginning period to the next fuel injection beginning period in the multiple fuel injections by the fuel injection valve 4 (see FIG. 4). The ignition pitch corresponds to a period from the ignition beginning period (i.e., discharge beginning period) to the next ignition beginning period in the multiple ignitions by the ignition plug 5 (see FIG. 4).

The ECU 7 of the present embodiment executes the interval varying control of varying the interval of the injection timing and the ignition timing for multiple times, that is, the injection/ignition interval. Typically, the ECU 7 executes the interval varying control of varying the injection/ignition interval by shifting an interval (interval of respective ON timing) of an injection signal to the fuel injection valve 4 and a ignition signal to the ignition plug 5. Furthermore, the ECU 7 varies the injection/ignition interval by adjusting a correlation of the multiple injection pitches and the multiple ignition pitches.

In the ignition start, the ECU 7 of the present embodiment makes the multiple injection pitches and the multiple ignition pitches constant and then creates a phase difference with each other to adjust the correlation of the injection pitch and the ignition pitch and vary the injection/ignition interval.

Specifically, the ECU 7 sets the injection pitch according to the ignition pitch in the ignition start to have each of the injection pitch and the ignition pitch constant and create a phase difference with each other. The ECU 7 sets the ignition pitch to a predetermined pitch set in advance herein.

For example, one example is illustrated in FIG. 3, where the ignition plug 5 flows current to an igniter primary coil (hereinafter sometimes referred to as "primary coil") 5a so that an electric energy is charged to the primary coil 5a, and thereafter, the current flow to the primary coil 5a is stopped so that a back electromotive current is generated at the primary coil 5a. The ignition plug 5 is induced by the back electromotive current generated in the primary coil 5a, whereby the current flows to a secondary coil 5b thus generating a high pressure voltage. The ignition plug 5 thus causes discharging and ignites the mixture gas.

Therefore, the ignition pitch by the ignition plug 5 is defined according to the charging time and the discharging time. The charging time is proportional to the magnitude of the electric energy charged to the primary coil 5a, and the discharging time is proportional to the spark discharging time in the ignition plug 5. The intensity of the ignition (hereinafter sometimes referred to as "ignition intensity") by the ignition plug 5 is the intensity corresponding to the charging time, in other words, the electric energy to be charged to the primary coil 5a. That is, the ignition plug 5 has a tendency in which the ignition pitch becomes shorter but the ignition intensity becomes weaker the shorter the charging time. On the contrary, the ignition plug 5 has a tendency in which the ignition intensity becomes stronger but the ignition pitch becomes longer the longer the charging time.

The ignition pitch is set in advance according to an actual vehicle evaluation, and the like in view of the minimum charging time at which an appropriate ignition can be carried out, the discharging time, and the like, for example, and is stored in the storage unit of the ECU 7. In this case, the ignition pitch is preferably set shorter than a period in which the fuel spray 4a injected from the fuel injection valve 4 passes an ignition position of the ignition plug 5. The period in which the fuel spray 4a injected from the fuel injection valve 4 passes the vicinity of the ignition plug 5 can be obtained, for example, by a position relationship of the fuel injection valve 4 and the ignition plug 5, the actual vehicle evaluation, and the like. Thus, the engine 1 can carry out multiple ignitions from when the fuel (mixture gas) is injected until the fuel passes the vicinity of the ignition position of the ignition plug 5, whereby the probability (ignition probability) the fuel (mixture gas) can be ignited during a flammable state can be enhanced, accidental fire in the ignition start can be suppressed, and the starting property can be enhanced.

In the ignition start, the ECU 7 assumes the multiple injection pitches as a pitch obtained by adding a value, which is obtained by dividing the ignition pitch by the number of injections of the fuel injection, to the integral multiples of the ignition pitch set in advance. That is, the ECU 7 calculates the injection pitch using the following equation (1), for example. In the equation (1), "N" represents an integer.

$$\text{Injection pitch} = \text{ignition pitch} \times N + \text{ignition pitch/number of injections} \tag{1}$$

FIG. 4 is a timing chart illustrating one example of the ignition pitch and the injection pitch set as described above. In FIG. 4, the horizontal axis indicates a time axis, and the vertical axis indicates ON/OFF of the ignition signal and ON/OFF of the injection signal. For the injection signal illustrated in FIG. 4, a case of two-time injections is illustrated on the upper level and a case of three-time injections is illustrated on the lower level. The fuel injection valve 4 pauses the injection of the fuel when the injection signal is turned OFF, and injects the fuel into the combustion chamber 3 when the injection signal is turned ON. The ignition plug 5 charges when the ignition signal is turned OFF and discharges (ignites) when the ignition signal is turned ON. In the following example, a case in which "N=1" is applied to the equation (1) will be described.

In the example illustrated in FIG. 4, the injection pitch is calculated using the equation (1), and is set to about 1.5 times the ignition pitch for the two-time injections and set to about 1.33 times the ignition pitch for the three-time injections.

The ECU 7 sets the ignition pitch and the injection pitch in the above manner, so that the ignition pitch can be made shorter than the injection pitch in the ignition start, and then the injection/ignition interval can be gradually changed. That is, the ECU 7 can execute the multiple ignitions in a cycle shorter than the injection cycle of the fuel, and can have each of the injection pitch and the ignition pitch set constant without being changed with elapse of time and create a phase difference with each other in the ignition start of this time. Thus, the ECU 7 can adjust the correlation of the injection pitch and the ignition pitch and vary the injection/ignition interval, that is, give a pitch shift between the fuel injection and ignition by setting the ignition pitch and the injection pitch in the above manner in the ignition start.

As a result, even if the ignition cannot be carried out in the first ignition with respect to the fuel injected to the combustion chamber 3, that is, even if the fuel passed the vicinity of the ignition position of the ignition plug 5 before the ignition in the ignition start, for example, the engine 1 can enhance the ignition probability in the subsequent ignition as the injection/ignition interval can be varied. In other words, the engine 1 gradually changes the injection/ignition interval in the ignition start of the relevant time to enhance the probability (ignition probability) the fuel can be ignited while the fuel passes the vicinity of the ignition position of the ignition plug 5 in the subsequent fuel injection and ignition.

In the example illustrated in FIG. 4, even if the first fuel injection cannot be carried out in the two-time injections and the ignition cannot be carried out in the ignition, for example, the engine 1 can enhance the probability the fuel can be ignited in the second ignition in which the possibility the fuel spray 4a and the ignition plug 5 are brought close is high by shifting the interval of the injection timing and the ignition timing by about "ignition pitch/2" in the subsequent operations. Similarly, even if the first fuel injection cannot be carried out in the three-time injections and the ignition cannot be carried out in the ignition, for example, the engine 1 can enhance the probability the fuel can be ignited in the third ignition in which the possibility the fuel spray 4a and the ignition plug 5 are brought close is high by shifting the interval of the injection timing and the ignition timing by about "ignition pitch/3" in the subsequent operations.

Therefore, the engine 1 can enhance the ignition probability and the ignition performance and suppress the accidental fire in the ignition start, and can reliably start the ignition and enhance the starting property. The engine 1 thus can increase the frequency of being started by the ignition start and suppress the frequency of the MG start, whereby the power consumption can be suppressed and the fuel economy performance can be enhanced.

The engine 1 adjusts the correlation of the injection pitch and the ignition pitch and varies the injection/ignition interval in the ignition start to enhance the ignition probability, and hence can suppress the multiple ignitions and the multiple injections of more than necessary compared to when randomly executing the multiple ignitions and the multiple injections. In this regard, the engine 1 can suppress the power consumption and the fuel consumption in the ignition start.

The ECU 7 of the present embodiment can vary the injection/ignition interval by simply setting the injection pitch according to the ignition pitch at the beginning of the ignition start, and thus can relatively suppress the computation amount and simplify the control content.

The ECU 7, for example, determines that the ignition is successful when the crank angle sensor 42 detects change in the crank angle, that is, the rotation of the crankshaft 6 or when the cylinder pressure sensor 43 detects increase in the cylinder pressure, and terminates the multiple fuel injections by the fuel injection valve 4 and the multiple ignitions by the ignition plug 5. Thus, the engine 1 can suppress the unnecessary fuel injections and ignitions, and suppress the fuel consumption and the power consumption in the ignition start. The ECU 7 can use the ignition determination based on the cylinder pressure detected by the cylinder pressure sensor 43 to check the ignition at an early stage than when carrying out the ignition determination by detecting the rotation of the crankshaft 6 with the crank angle sensor 42, and the like. The ECU 7 can simultaneously use the ignition determination based on the cylinder pressure detected by the cylinder pressure sensor 43 and the ignition determination based on the crank angle detected by the crank angle sensor 42 to more reliably check the ignition in the ignition start.

Now, one example of the control by the ECU 7 in the engine 1 will be described with reference to the flowchart of FIG. 5. The control routines are repeatedly executed at a control cycle of every few millisecond to a few dozen milliseconds (this is the same in the description made below).

First, the ECU 7 determines whether or not to execute the ignition start based on the detection result by the state detection device 23 and the operation state of each unit (ST1). When determining not to execute the ignition start (ST1: No), the ECU 7 terminates the present control cycle and proceeds to the next control cycle.

When determining to execute the ignition start (ST1: Yes), the ECU 7 sets the ignition pitch in the ignition start (ST2). The ECU 7 sets the pitch set in advance according to the minimum charging time at which the appropriate ignition can be carried out, the discharging time, the period in which the fuel spray 4a injected from the fuel injection valve 4 passes the vicinity of the ignition position of the ignition plug 5, and the like as the ignition pitch.

The ECU 7 sets the injection amount and the number of injections of the fuel in the ignition start (ST3). The ECU 7, for example, sets the injection amount and the number of injections of the fuel in the ignition start based on the crank angle in a state the engine 1 is stopped detected by the crank angle sensor 42, for example.

The ECU 7 sets the injection pitch of the fuel in the ignition start according to the ignition pitch set in ST2 (ST4). The ECU 7, for example, sets the injection pitch using the equation (1) based on the ignition pitch set in ST2 and the number of injections of the fuel set in ST3.

The ECU 7 executes the ignition start based on the ignition pitch set in ST2, the injection amount and the number of injections of the fuel set in ST3, and the injection pitch set in ST4 (ST5).

The ECU 7 then determines whether or not the fuel is ignited (ST6). For example, the ECU 7 determines whether or not the fuel is ignited based on the crank angle detected by the crank angle sensor 42, the cylinder pressure detected by the cylinder pressure sensor 43, and the like. When determining that the fuel is not ignited (ST6: No), the ECU 7 returns to ST5 to continue the ignition start.

When determining that the fuel is ignited (ST6: Yes), the ECU 7 terminates the fuel injection by the fuel injection valve 4 and the ignition by the ignition plug 5 to terminate the ignition start (ST7), terminates the present control cycle and proceeds to the next control cycle.

The engine 1 according to the embodiment described above includes the combustion chamber 3, the cylinder direct injection type fuel injection valve 4, the ignition plug 5, the crankshaft 6, and the ECU 7. In the combustion chamber 3, the mixture of air and fuel can be combusted. The fuel injection valve 4 can inject fuel to the combustion chamber 3. The ignition plug 5 can ignite the mixture gas in the combustion chamber 3. The crankshaft 6 is rotatable with the combustion of the mixture gas in the combustion chamber 3. The ECU 7 controls the fuel injection valve 4 and the ignition plug 5, and executes the injection of the fuel and the ignition over multiple times and also executes the control of varying the interval between the fuel injection timing and the ignition timing in the ignition start of injecting the fuel in the combustion chamber 3 in the expansion stroke and igniting the fuel with the rotation of the crankshaft 6 stopped to start the rotation of the crankshaft 6. The ECU 7 adjusts the correlation of the pitch of the injection of the fuel over multiple times and the pitch of the ignition over multiple times to vary the interval of the fuel injection timing and the ignition timing.

Therefore, the engine 1 and the ECU 7 can enhance the ignition probability and the ignition performance and suppress the accidental fire in the ignition start, and thus can enhance the starting property by varying the interval of the injection timing and the ignition timing in the ignition start.

The ignition plug 5 described above may adopt the configuration illustrated in FIGS. 6 and 7, for example, to reduce the charging time and further shorten the ignition pitch.

The ignition plug 5 illustrated in FIG. 6 includes two types of primary coils 5a, a low resistance side primary coil 5c and a high resistance side primary coil 5d having a higher resistance than the low resistance side primary coil 5c. The ECU 7 flows current to the high resistance side primary coil 5d and charges the electric energy to the high resistance side primary coil 5d other than at the time of the ignition start. On the contrary, the ECU 7 flows current to the low resistance side primary coil 5c and charges the electric energy to the low resistance side primary coil 5c at the time of the ignition start. As illustrated in FIG. 8, when flowing current to the low resistance side primary coil 5c, that is, in the case of the ignition start, the ECU 7 can increase the current flowing to the primary coil 5a (low resistance side primary coil 5c) at the time of charging compared to when flowing current to the high resistance side primary coil 5d. Thus, the ignition plug 5 can make the ignition pitch relatively short with respect to the injection pitch since the necessary electric energy is charged to the primary coil 5a in a short period of time. As a result, the engine 1 can make the ignition pitch at the time of the ignition start relatively short with respect to the injection pitch, and hence can further enhance the ignition probability and further enhance the starting property. Furthermore, the ECU 7 can suppress the heat generation in the primary coil 5a other than at the time of the ignition start by flowing current to the high resistance side primary coil 5d other than at the time of the ignition start, whereby lowering in durability, and degradation can be suppressed.

The ignition plug 5 illustrated in FIG. 7 includes two types of current flowing power supplies, a normal (regular) battery power supply (hereinafter sometimes referred to as "+B power supply") 5e, and a high voltage power supply 5f capable of applying higher voltage than the +B power supply 5e. The ECU 7 applies voltage (battery voltage) to the primary coil 5a by the +B power supply 5e to flow current thereto, and charges the electric energy in the primary coil 5a other than at the time of the ignition start. On the contrary, the ECU 7 applies voltage (higher voltage than the battery voltage) to the primary coil 5a by the high voltage power supply 5f to flow current thereto, and charges the electric energy in the primary coil 5a at the time of the ignition start. Thus, as illustrated in FIG. 8, when charging with the high voltage power supply 5f, that is, in the case of the ignition start, the ECU 7 can increase the current flowing to the primary coil 5a at the time of charging compared to when charging with the +B power supply 5e. Thus, the ignition plug 5 can make the ignition pitch relatively short with respect to the injection pitch since the necessary electric energy is charged to the primary coil 5a in a short period of time. As a result, the engine 1 can make the ignition pitch at the time of the ignition start relatively short with respect to the injection pitch, and hence can further enhance the ignition probability and further enhance the starting property. The ECU 7 can suppress the heat generation in the primary coil 5a other than at the time of the ignition start by charging with the +B power supply 5e other than at the time of the ignition start, whereby lowering in durability, and degradation can be suppressed.

Second Embodiment

Figure 9:
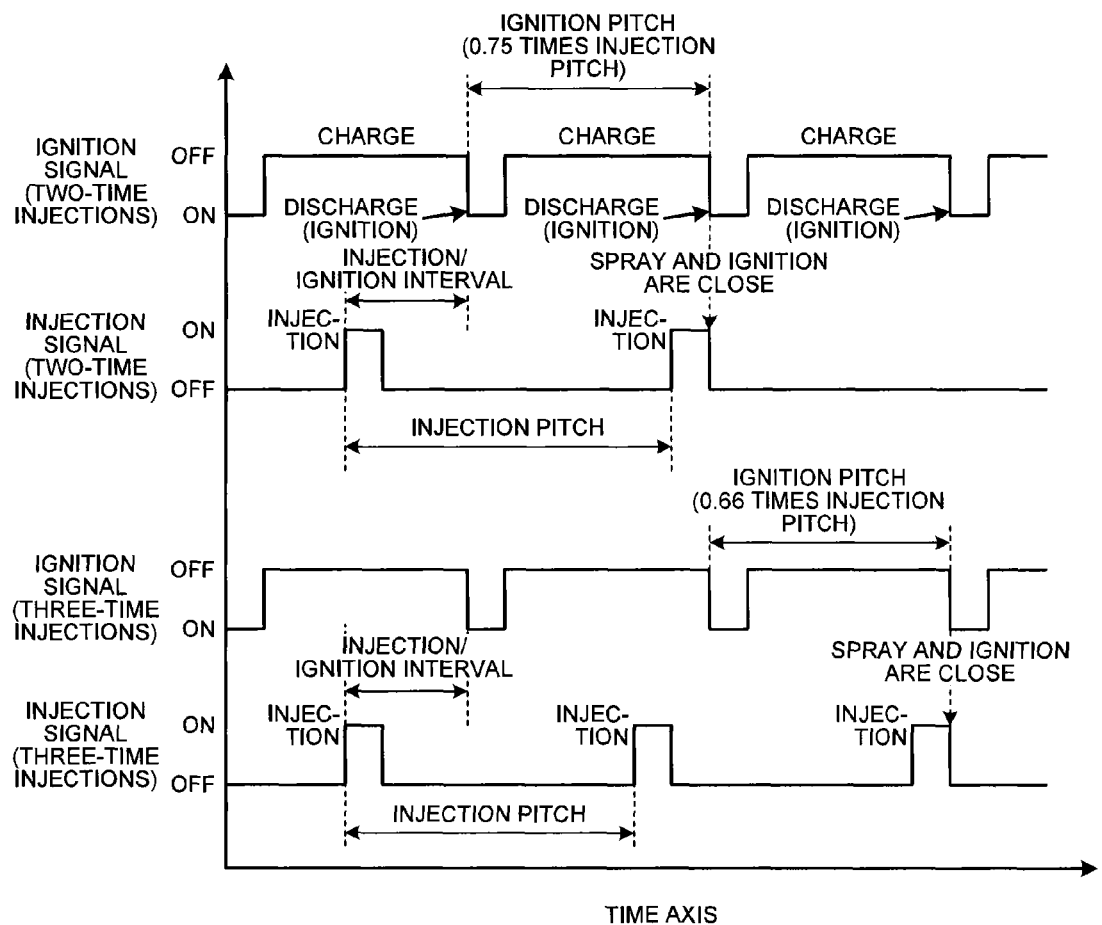
FIG. 9 is a timing chart illustrating one example of an ignition pitch and an injection pitch of an engine according to a second embodiment.
Figure 10:
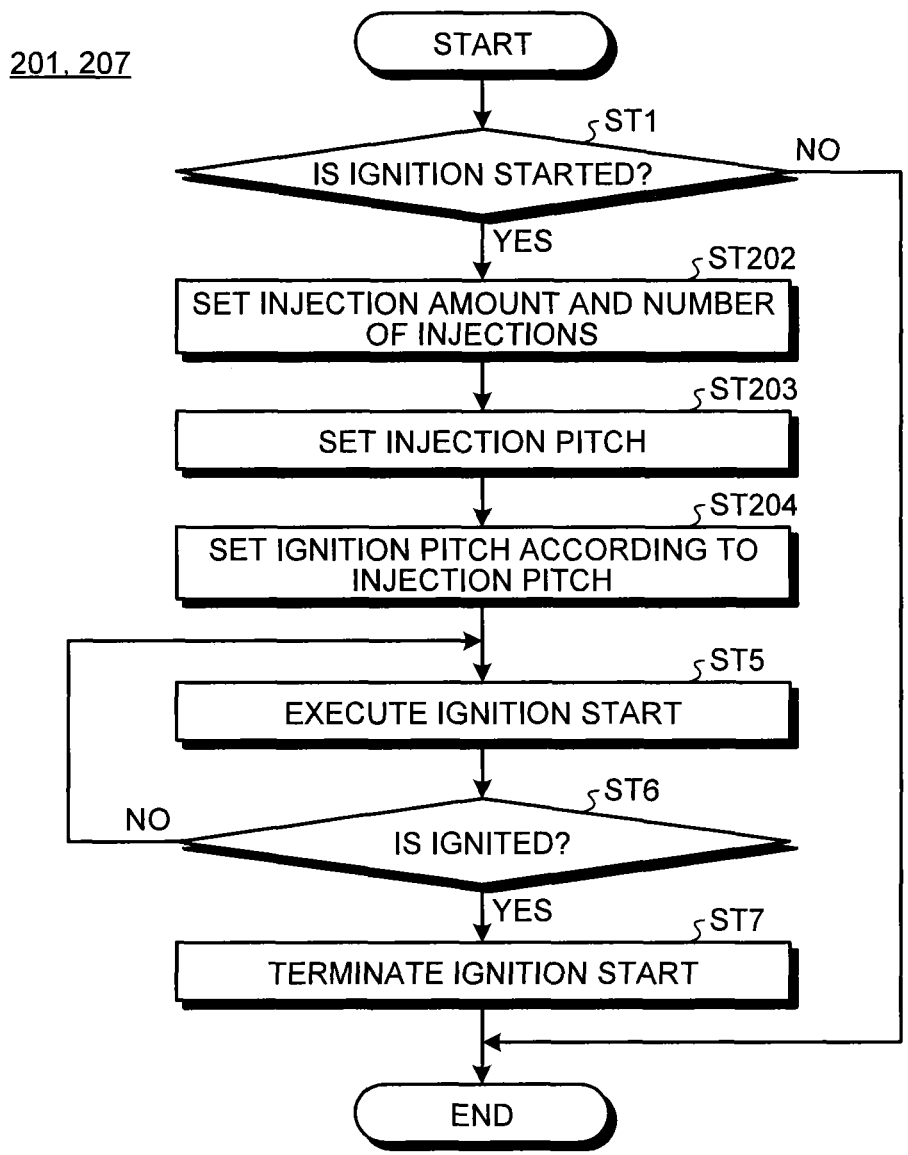
FIG. 10 is a flowchart illustrating one example of an interval varying control by an ECU of the engine according to the second embodiment.

FIG. 9 is a timing chart illustrating one example of the ignition pitch and the injection pitch of an engine according to a second embodiment, and FIG. 10 is a flowchart illustrating one example of an interval varying control by an ECU of the engine according to the second embodiment. The internal combustion engine and the control device of the internal combustion engine according to the second embodiment differ from the first embodiment in the content of the control. In addition, the redundant description on the configurations, operations, and effects common with the embodiment described above will be omitted as much as possible. FIGS. 1 and 2 will be appropriately referenced (this is the same in the following embodiments) for the details of each configuration of the internal combustion engine and the control device of the internal combustion engine according to the second embodiment.

An engine 201 (see FIGS. 1 and 2) serving as an internal combustion engine of the present embodiment includes an ECU 207 (see FIGS. 1 and 2) serving as a control device. In the ignition start, the ECU 207 of the present embodiment makes the multiple injection pitches and the multiple ignition pitches constant and then creates a phase difference with each other to adjust the correlation of the injection pitch and the ignition pitch and vary the injection/ignition interval.

Specifically, in the ignition start, the ECU 207 sets the ignition pitch according to the injection pitch to make the injection pitch and the ignition pitch constant and then creates a phase difference with each other.

The ECU 207 sets the injection pitch according to the injection amount and the number of injections of the fuel in the ignition start. The ECU 207 sets the injection amount and the number of injections of the fuel in the ignition start based on the crank angle of when the engine 1 is stopped detected by the crank angle sensor 42, for example. The ECU 207 sets the injection pitch based on the set injection amount and the number of injections of the fuel, a minimum pause time at which appropriate fuel injection can be carried out, a minimum injection time at which a stable fuel injection can be carried out, and the like. The minimum pause time at which the appropriate fuel injection can be carried out is, for example, defined according to the time with which the fuel pressure at which the fuel injection can be carried out can be appropriately ensured with respect to the combustion chamber 3, and the like.

In the ignition start, the ECU 207 assumes the multiple ignition pitches as a pitch obtained by dividing a value, in which the number of injections of the injection of the fuel is multiplied to the injection pitch set in the above, by a value, in which one is added to the number of injections of the injection of the fuel. That is, the ECU 207 calculates the ignition pitch using, for example, equation (2).

Ignition pitch=(injection pitch×number of injections)/(number of injections+1)     (2)

FIG. 9 is a timing chart illustrating one example of the ignition pitch and the injection pitch set in the above manner. Regarding the ignition signal and the injection signal illustrated in FIG. 9, the upper level illustrates a case of two-time injections and the lower stage illustrates a case of three-time injections.

In the example illustrated in FIG. 9, the ignition pitch is calculated using the equation (2) to be set to about 0.75 times the injection pitch in the two-time injections, and set to about 0.66 times the injection pitch in the three-time injections.

The ECU 207 can set the ignition pitch and the injection pitch in the above manner so that the ignition pitch is shorter than the injection pitch and gradually can change the injection/ignition interval in the ignition start. As a result, as illustrated in FIG. 9, in the ignition start, for example, if the ignition cannot be carried out in the first ignition with respect to the fuel injected to the combustion chamber 3, that is, even if the fuel passed the vicinity of the ignition position of the ignition plug 5 before the ignition, the engine 201 can enhance the ignition probability in the subsequent ignitions as the injection/ignition interval can be varied. In other words, the engine 201 can enhance the probability (ignition probability) at which the fuel can be ignited while the fuel passes the vicinity of the ignition position of the ignition plug 5 in the following fuel injection and ignition as the injection/ignition interval is gradually changed in the ignition start of the relevant time. Therefore, the engine 201 can enhance the ignition probability and the ignition performance and suppress the accidental fire in the ignition start, and can reliably start the ignition and enhance the starting property. The ECU 207 of the present embodiment can vary the injection/ignition interval by simply setting the ignition pitch according to the injection pitch at the beginning of the ignition start, and thus can relatively suppress the computation amount and simplify the control content.

One example of a control by the ECU 207 in the engine 201 will now be described with reference to the flowchart of FIG. 10. The description redundant with the description of the FIG. 5 will be omitted as much as possible (this is the same below).

When determining to execute the ignition start (ST1: Yes), the ECU 207 sets the injection amount and the number of injections of the fuel in the ignition start (ST202).

The ECU 207 sets the injection pitch based on the injection amount and the number of injections of the fuel set in ST202, the minimum pause time at which the appropriate fuel injection can be carried out, the minimum injection time at which the stable fuel injection can be carried out, and the like (ST203).

Next, the ECU 207 sets the ignition pitch in the ignition start according to the injection pitch set in ST203 (ST204). The ECU 207, for example, sets the ignition pitch using the equation (2) described above based on the number of injections set in ST202 and the injection pitch set in ST203.

The ECU 207 executes the ignition start based on the injection amount and the number of injections of the fuel set in ST202, the injection pitch set in ST203, and the ignition pitch set in ST204 (ST5).

The engine 201 and the ECU 207 according to the embodiment described above vary the interval of the injection timing and the ignition timing in the ignition start to enhance the ignition probability and the ignition performance and suppress the accidental fire in the ignition start, and can enhance the starting property.

Third Embodiment

Figure 11:
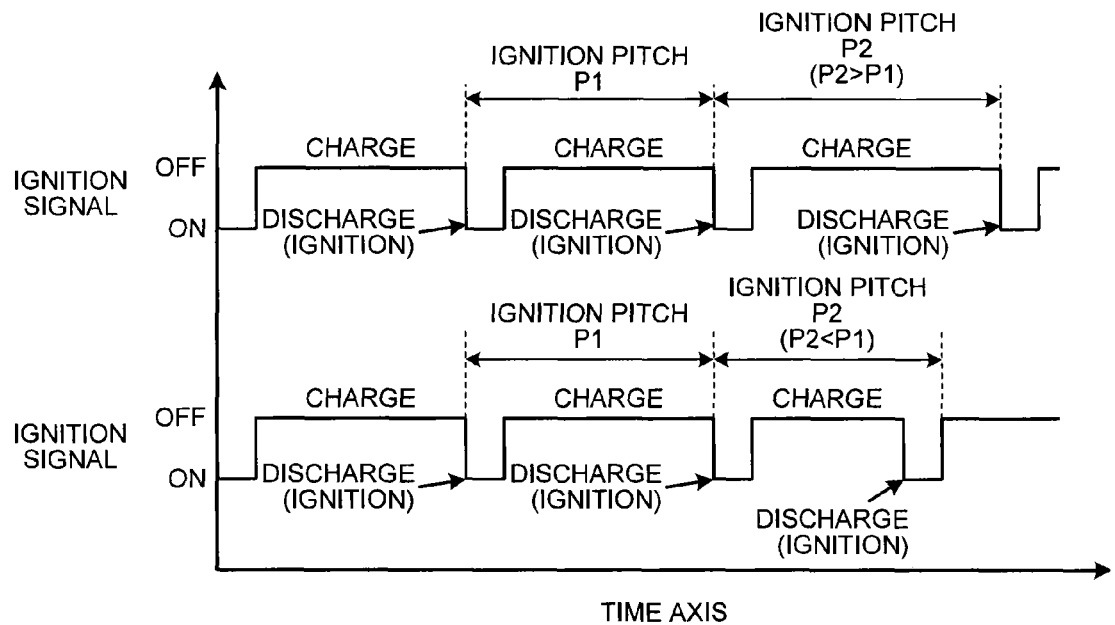
FIG. 11 is a timing chart illustrating one example of an ignition pitch of an engine according to a third embodiment.
Figure 12:
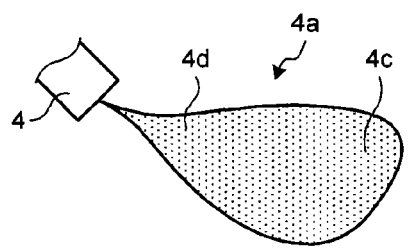
FIG. 12 is a schematic view describing properties of fuel spray.
Figure 13:
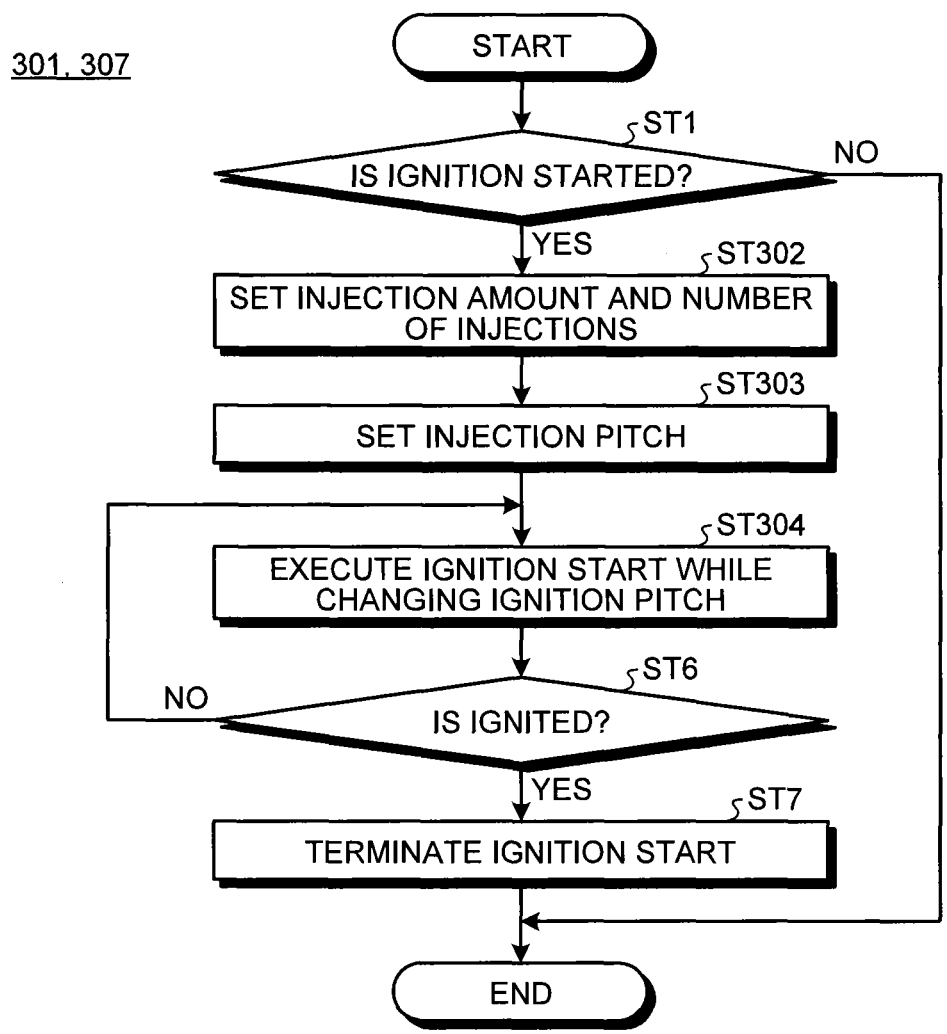
FIG. 13 is a flowchart illustrating one example of an interval varying control by an ECU of the engine according to the third embodiment.

FIG. 11 is a timing chart illustrating one example of a ignition pitch of an engine according to a third embodiment, FIG. 12 is a schematic view describing properties of the fuel spray, and FIG. 13 is a flowchart illustrating one example of an interval varying control by a ECU of the engine according to the third embodiment. The internal combustion engine and the control device of the internal combustion engine according to the third embodiment differ from the first and second embodiments in the content of the control.

An engine 301 (see FIGS. 1 and 2) serving as an internal combustion engine of the present embodiment includes an ECU 307 (see FIGS. 1 and 2) serving as a control device. The ECU 307 of the present embodiment controls the ignition plug 5 and carries out the ignition pitch varying control of varying the multiple ignition pitches in the ignition start to adjust the correlation of the injection pitch and the ignition pitch, and vary the injection/ignition interval.

Specifically, the ECU 307 makes the injection pitch constant and then changes the ignition pitch itself in the ignition start. That is, the ECU 307 varies the multiple ignition pitches for each ignition. In the ignition start, the ECU 307 increases or decreases the multiple ignition pitches with elapse of time. For example, the ECU 307 increases or decreases the multiple ignition pitches by a constant rate (e.g., 10 to 20%) set in advance with elapse of time.

FIG. 11 is a timing chart illustrating one example of the ignition pitch set in the above manner. By way of example, the upper level of FIG. 11 illustrates a case in which the ECU 307 makes the multiple ignition pitches relatively long with respect to the previous ignition pitch with elapse of time, and the lower level of FIG. 11 illustrates a case in which the ECU 307 makes the multiple ignition pitches relatively short with respect to the previous ignition pitch with elapse of time. In the upper level of FIG. 11, an ignition pitch P2 of the second ignition and the third ignition is set to be longer than an ignition pitch P1 of the first ignition and the second ignition by a constant rate set in advance. In the lower level of FIG. 11, the ignition pitch P2 of the second ignition and the third ignition is set to be shorter than the ignition pitch P1 of the first ignition and the second ignition by a constant rate set in advance.

The ECU 307 can gradually change the injection/ignition interval by varying the ignition pitch in the ignition start. As a result, if the ignition cannot be carried out in the first ignition with respect to the fuel injected to the combustion chamber 3, that is, even if the fuel passed the vicinity of the ignition position of the ignition plug 5 before the ignition in the ignition start, the engine 301 can enhance the ignition probability in the subsequent ignitions as the injection/ignition interval can be varied. In other words, the engine 301 gradually changes the injection/ignition interval in the ignition start of the relevant time to enhance the probability (ignition probability) at which the ignition can be carried out while the fuel passes the vicinity of the ignition position of the ignition plug 5 in the following fuel injection and ignition. Therefore, the engine 301 can enhance the ignition probability and the ignition performance and suppress the accidental fire in the ignition start, and can reliably start the ignition and enhance the starting property.

Furthermore, in this case, as illustrated in the upper level of FIG. 11, the ECU 307 makes the multiple ignition pitches relatively long with respect to the previous ignition pitch with elapse of time in the ignition start to obtain the ignition pitch that accords with the properties of the fuel spray 4a injected from the fuel injection valve 4.

As illustrated in FIG. 12, the fuel spray 4a injected from the fuel injection valve 4 tends to have a high speed and a high fuel concentration (air fuel ratio (A/F)) at a distal end portion 4c, and a slow speed and a low fuel concentration at a back end portion 4d. That is, the fuel spray 4a is easily ignited but has a fast speed at the distal end portion 4c, and is less likely to be ignited but has a slow speed at the back end portion 4d.

In the ignition start, the ECU 307 carries out ignition at substantially the same time as the fuel injection and makes the charging time relatively short and the ignition pitch as short as possible at the beginning of the ignition start, and thereafter, gradually lengthens the ignition pitch with elapse of time. As a result, when the distal end portion 4c of the fuel spray 4a having a fast speed reaches the vicinity of the ignition plug 5, the ECU 307 can make the ignition pitch relatively short, and carry out the ignition without the missing an appropriate ignition timing. In this case, the ignition intensity by the ignition plug 5 becomes relatively weak if the charging time is relatively short, but the fuel concentration at the distal end portion 4c of the fuel spray 4a is relatively high and has a tendency of being easily ignited, so that the ignition plug 5 can appropriately ignite the fuel even if the ignition intensity is weak.

The ECU 307 makes the multiple ignition pitches relatively long with respect to the previous ignition pitch with elapse of time in the ignition start, so that the ignition pitch becomes relatively long and the charging time becomes relatively long when the back end portion 4d of the fuel spray 4a having a slow speed reaches the vicinity of the ignition plug 5. As a result, the ECU 307 can reliably ignite the fuel at an appropriate ignition intensity when the back end portion 4d of the fuel spray 4a having a low fuel concentration reaches the vicinity of the ignition plug 5.

As a result, the engine 301 can vary the injection/ignition interval according to the properties (fuel concentration, speed) of the fuel spray 4a injected from the fuel injection valve 4, and can further enhance the ignition probability.

One example of a control by the ECU 307 in the engine 301 will now be described with reference to the flowchart of FIG. 13.

When determining to execute the ignition start (ST1: Yes), the ECU 307 sets the injection amount and the number of injections of the fuel in the ignition start (ST302).

The ECU 307 then sets the injection pitch based on the injection amount and the number of injections of the fuel set in ST302, the minimum pause time in which the appropriate fuel injection can be carried out, the minimum injection time at which the stable fuel injection can be carried out, and the like (ST303).

The ECU 307 executes the ignition start (ST304) while changing (increasing or decreasing) the ignition pitch based on the injection amount and the number of injections of the fuel set in ST302, and the injection pitch set in ST303.

The ECU 307 determines whether or not the fuel is ignited, and returns to ST304 and continues the ignition start when determining that the fuel is not ignited (ST6: No).

The engine 301 and the ECU 307 according to the embodiment described above can enhance the ignition probability and the ignition performance and suppress the accidental fire in the ignition start, and can enhance the starting property by varying the interval of the injection timing and the ignition timing in the ignition start.

Fourth Embodiment

Figure 14:
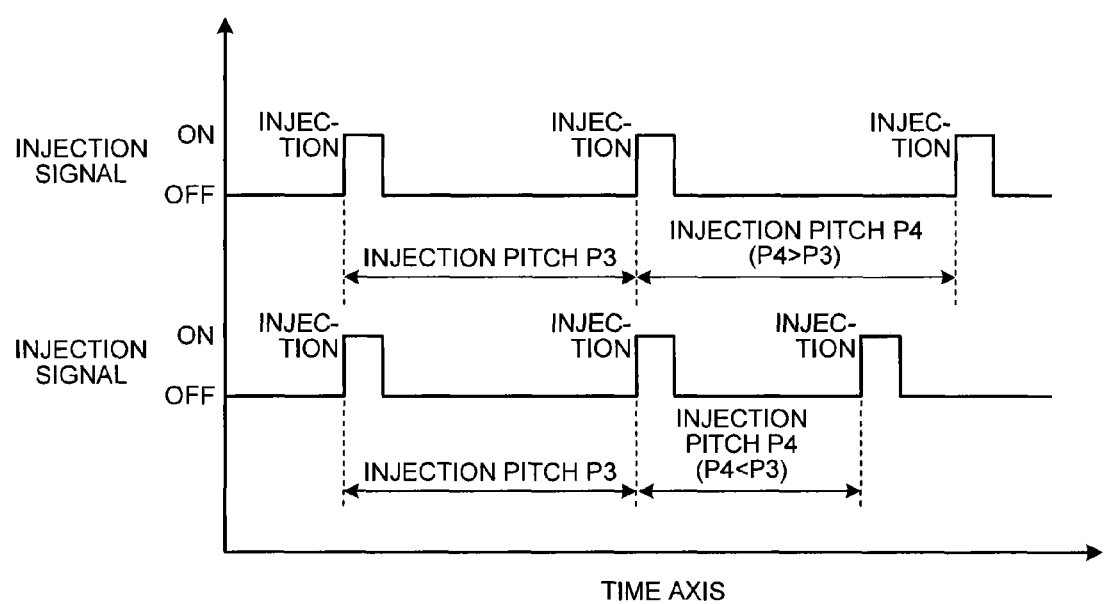
FIG. 14 is a timing chart illustrating one example of an injection pitch of an engine according to a fourth embodiment.
Figure 15:
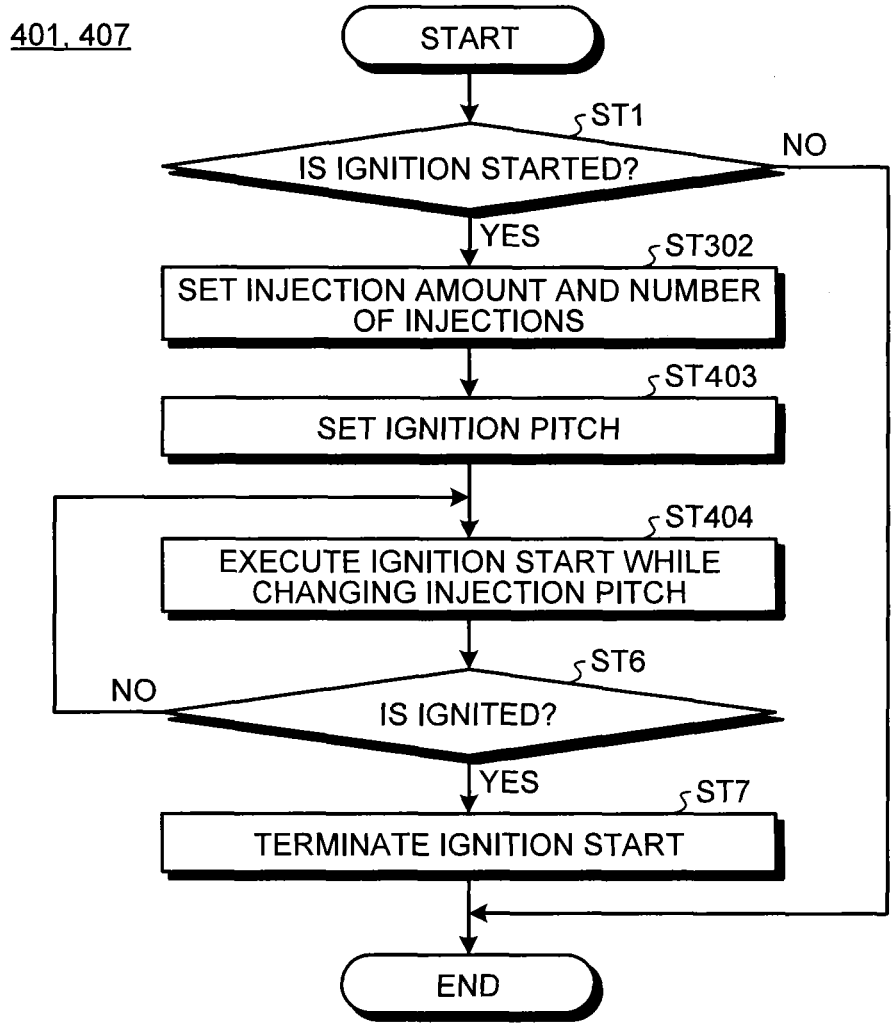
FIG. 15 is a flowchart illustrating one example of an interval varying control by an ECU of the engine according to the fourth embodiment.

FIG. 14 is a timing chart illustrating one example of an injection pitch of an engine according to a fourth embodiment, and FIG. 15 is a flowchart illustrating one example of an interval varying control by an ECU of the engine according to the fourth embodiment. The internal combustion engine and the control device of the internal combustion engine according to the fourth embodiment differ from the first to third embodiments in the content of control.

An engine 401 (see FIGS. 1 and 2) serving as the internal combustion engine of the present embodiment includes an ECU 407 (see FIGS. 1 and 2) serving as a control device. The ECU 407 of the present embodiment controls the fuel injection valve 4 and carries out the injection pitch varying control of varying the multiple injection pitches in the injection start to adjust the correlation of the injection pitch and the ignition pitch and vary the injection/ignition interval.

Specifically, the ECU 407 makes the ignition pitch constant and changes the injection pitch itself in the ignition start. That is, the ECU 407 varies the multiple injection pitches for every fuel injection. The ECU 407 increases and decreases the multiple injection pitches with elapse of time in the ignition start. The ECU 407, for example, increases and decreases the multiple injection pitches by a constant rate (e.g., 10 to 20%) set in advance with elapse of time.

FIG. 14 is a timing chart illustrating one example of the injection pitch set as described above. By way of example, the upper level of FIG. 14 illustrates a case in which the ECU 407 makes the multiple injection pitches relatively long with respect to the previous injection pitch with elapse of time, and the lower level of FIG. 14 illustrates a case in which the ECU 407 makes the multiple injection pitches relatively short with respect to the previous injection pitch with elapse of time. In the upper level of FIG. 14, an injection pitch P4 of the second fuel injection and the third fuel injection is set to be longer than an injection pitch P3 of the first fuel injection and the second fuel injection by a constant rate set in advance. In the lower level of FIG. 14, the injection pitch P4 of the second fuel injection and the third fuel injection is set to be shorter than the injection pitch P3 of the first fuel injection and the second fuel injection by a constant rate set in advance.

The ECU 407 can gradually change the injection/ignition interval by varying the injection pitch in the ignition start as described above. As a result, when the ignition is not carried out in the first ignition with respect to the fuel injected to the combustion chamber 3, that is, even if the fuel passed the vicinity of the ignition position of the ignition plug 5 before the ignition in the ignition start, for example, the engine 401 can enhance the ignition probability in the subsequent ignitions as the injection/ignition interval can be varied. In other words, the engine 401 can enhance the probability (ignition probability) at which the ignition can be carried out while the fuel passes the vicinity of the ignition position of the ignition plug 5 in the following fuel injection and ignition as the injection/ignition interval is gradually changed in the ignition start of the relevant time. Therefore, the engine 401 can enhance the ignition probability and the ignition performance and suppress the accidental fire in the ignition start, and can reliably start the ignition and enhance the starting property.

One example of the control by the ECU 407 in the engine 401 will now be described with reference to the flowchart of FIG. 15.

The ECU 407 sets the injection amount and the number of injections of the fuel in the ignition start (ST302), and then sets the ignition pitch in the ignition start (ST403). The ECU 407 sets, for example, the pitch set in advance according to the minimum charging time at which appropriate ignition can be carried out, discharging time, period in which the fuel spray 4a injected from the fuel injection valve 4 passes the vicinity of the ignition position of the ignition plug 5, and the like as the ignition pitch.

The ECU 407 executes the ignition start while changing (increasing/decreasing) the injection pitch based on the injection amount and the number of injections of the fuel set in ST302, and the ignition pitch set in ST403 (ST404).

The ECU 407 determines whether or not the ignition is carried, and returns to ST404 and continues the ignition start when determining that the ignition is not carried out (ST6: No).

The engine 401 and the ECU 407 according to the embodiment described above enhance the ignition probability and the ignition performance and suppress the accidental fire in the ignition start, and enhance the starting property by varying the interval of the injection timing and the ignition timing in the ignition start.

The internal combustion engine and the control device of the internal combustion engine according to the embodiment of the present invention described above are not limited to the embodiments described above, and various changes can be made within a scope defined in the Claims. The internal combustion engine and the control device of the internal combustion engine according to the present embodiment may be configured by appropriately combining the configuring elements of each of the embodiments described above.

In the above description, the control device of the internal combustion engine has been described as the ECU for controlling each unit of the vehicle, but is not limited thereto, and for example, may be configured separate from the ECU, and may be configured to exchange information such as detection signals, drive signals, control commands, and the like with the ECU.

REFERENCE SIGNS LIST

1, 201, 301, 401 ENGINE (INTERNAL COMBUSTION ENGINE)
2 VEHICLE
3 COMBUSTION CHAMBER
4 FUEL INJECTION VALVE (FUEL INJECTION DEVICE)
4a FUEL SPRAY
5 IGNITION PLUG (IGNITION DEVICE)
5a PRIMARY COIL
5b SECONDARY COIL
5c LOW RESISTANCE SIDE PRIMARY COIL
5d HIGH RESISTANCE SIDE PRIMARY COIL
5e NORMAL (REGULAR) BATTERY POWER SUPPLY, +B POWER SUPPLY
5f HIGH VOLTAGE POWER SUPPLY
6 CRANKSHAFT (OUTPUT SHAFT)
7, 207, 307, 407 ECU (CONTROL DEVICE OF INTERNAL COMBUSTION ENGINE)
42 CRANK ANGLE SENSOR
43 CYLINDER PRESSURE SENSOR

The invention claimed is:

1. An internal combustion engine comprising:
   a combustion chamber in which a mixture of gas of air and fuel is combustible;
   a cylinder direct injection type fuel injection device configured to be able to inject the fuel to the combustion chamber;
   an ignition device configured to be able to ignite the mixture gas in the combustion chamber;
   an output shaft capable of rotating with combustion of the mixture gas in the combustion chamber; and
   a control device configured to control the fuel injection device and the ignition device to execute injection of the fuel and ignition over multiple times and execute a control of varying an interval between a timing of the injection of the fuel and a timing of the ignition, at the time of an ignition start in which the fuel is injected into the combustion chamber in an expansion stroke with rotation of the output shaft is in a stopped state and the fuel is ignited to start the rotation of the output shaft, wherein
   the control device varies the interval between the timing of the injection of the fuel and the timing of the ignition by adjusting a correlation of a pitch of the injection of the fuel over multiple times and a pitch of the ignition over multiple times, and
   at the time of the ignition start, the control device controls the ignition device, executes a control of varying the pitch of the ignition over multiple times, and makes the pitch of the ignition over multiple times relatively long with respect to the pitch of the ignition of a previous time with elapse of time.

2. The internal combustion engine according to claim 1, wherein
   the fuel injection device carries out injection of the fuel in response to a fuel injection signal transmitted from the control device,
   the ignition device carries out ignition in response to an ignition signal transmitted from the control device, and
   the control device executes the control of varying an interval between the timing of the injection of the fuel and the timing of the ignition by shifting an interval between the fuel injection signal and the ignition signal.

3. An internal combustion engine comprising:
   a combustion chamber in which a mixture of gas of air and fuel is combustible;
   a cylinder direct injection type fuel injection device configured to be able to inject the fuel to the combustion chamber;
   an ignition device configured to be able to ignite the mixture gas in the combustion chamber;
   an output shaft capable of rotating with combustion of the mixture gas in the combustion chamber; and
   a control device configured to control the fuel injection device and the ignition device to execute injection of the fuel and ignition over multiple times and execute a control of varying an interval between a timing of the injection of the fuel and a timing of the ignition, at the time of an ignition start in which the fuel is injected into the combustion chamber in an expansion stroke with rotation of the output shaft is in a stopped state and the fuel is ignited to start the rotation of the output shaft, wherein the control device varies the interval between the timing of the injection of the fuel and the timing of the ignition by adjusting a correlation of a pitch of the injection of the fuel over multiple times and a pitch of the ignition over multiple times, and at the time of the ignition start, the control device controls the ignition device, executes a control of varying the pitch of the ignition over multiple times, and makes the pitch of the ignition over multiple times relatively short with respect to the pitch of the ignition of a previous time with elapse of time.

4. The internal combustion engine according to claim 3, wherein the fuel injection device carries out injection of the fuel in response to a fuel injection signal transmitted from the control device, the ignition device carries out ignition in response to an ignition signal transmitted from the control device, and the control device executes the control of varying an interval between the timing of the injection of the fuel and the timing of the ignition by shifting an interval between the fuel injection signal and the ignition signal.

5. A control device of an internal combustion engine, wherein the control device controls a fuel injection device and an ignition device of a cylinder direct injection type internal combustion engine in which a mixture of gas of air and fuel is combustible in a combustion chamber, executes injection of the fuel and ignition over multiple times, executes a control of varying an interval between a timing of the injection of the fuel and a timing of the ignition, at the time of an ignition start in which the fuel is injected into the combustion chamber in an expansion stroke with rotation of an output shaft of the internal combustion engine is in a stopped state and the fuel is ignited to start the rotation of the output shaft, the control device varies the interval between the timing of the injection of the fuel and the timing of the ignition by adjusting a correlation of a pitch of the injection of the fuel over multiple times and a pitch of the ignition over multiple times, and at the time of the ignition start, the control device controls the ignition device, executes a control of varying the pitch of the ignition over multiple times, and makes the pitch of the ignition over multiple times relatively long with respect to the pitch of the ignition of a previous time with elapse of time.

6. A control device of an internal combustion engine, wherein the control device controls a fuel injection device and an ignition device of a cylinder direct injection type internal combustion engine in which a mixture of gas of air and fuel is combustible in a combustion chamber, executes injection of the fuel and ignition over multiple times, executes a control of varying an interval between a timing of the injection of the fuel and a timing of the ignition, at the time of an ignition start in which the fuel is injected into the combustion chamber in an expansion stroke with rotation of an output shaft of the internal combustion engine is in a stopped state and the fuel is ignited to start the rotation of the output shaft, the control device varies the interval between the timing of the injection of the fuel and the timing of the ignition by adjusting a correlation of a pitch of the injection of the fuel over multiple times and a pitch of the ignition over multiple times, and at the time of the ignition start, the control device controls the ignition device, executes a control of varying the pitch of the ignition over multiple times, and makes the pitch of the ignition over multiple times relatively short with respect to the pitch of the ignition of a previous time with elapse of time.

* * * * *